United States Patent [19]

Tannery

[11] Patent Number: 4,610,095
[45] Date of Patent: Sep. 9, 1986

[54] ENGINE BEARING HEIGHT GAGE

[75] Inventor: Reinhard G. Tannery, Brighton, Mich.

[73] Assignee: Federal-Mogul Corporation, Southfield, Mich.

[21] Appl. No.: 472,431

[22] Filed: Mar. 7, 1983

[51] Int. Cl.⁴ .......................... G01B 5/00; G01B 7/00
[52] U.S. Cl. ................................. 33/517; 33/DIG. 17
[58] Field of Search ..................... 33/178 E, 517, 555, 33/DIG. 8, DIG. 17; 209/604

[56] References Cited

U.S. PATENT DOCUMENTS

| | | | |
|---|---|---|---|
| 1,856,944 | 5/1932 | Blomstrom | 33/517 |
| 3,864,835 | 2/1975 | Morisaki | 33/517 |
| 4,364,181 | 12/1982 | Albertazzi | 33/517 |

FOREIGN PATENT DOCUMENTS 501422  11/1976  U.S.S.R. ................. 33/517

Primary Examiner—Richard R. Stearns
Attorney, Agent, or Firm—Robert F. Hess; Lawrence J. Shurupoff

[57] ABSTRACT

A measuring apparatus for measuring the interference or height of semicylindrical articles such as shell-type half bearings or the like in which the articles to be measured are adapted to be disposed in a shape-conforming cavity of a bearing cap with one parting edge surface of the bearing being supported by the framework of the apparatus. A reciprocable gaging block incorporating a gaging surface is movable to and from a measuring position and a clearance position by means of a motor and cam carrier assembly which is biased toward the gaging block under a preselected load and the eccentric cam thereon effects an intermittent reciprocation of the gaging block to and from the measuring position. Biasing means are provided for continuously biasing the gaging block toward a nonmeasuring position. A probe is provided for sensing the interference or height of a bearing being measured in response to the disposition of the gaging surface relative to the bearing cap when the gage block is in the measuring position. The measuring gage apparatus is adapted for high-speed automatic operation employing integrated sensing and actuating members for effecting an automatic loading, unloading, measurement and distribution of the articles being measured.

12 Claims, 6 Drawing Figures

U.S. Patent  Sep. 9, 1986  Sheet 1 of 2  4,610,095
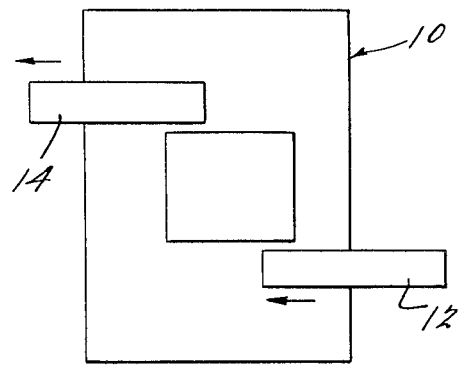
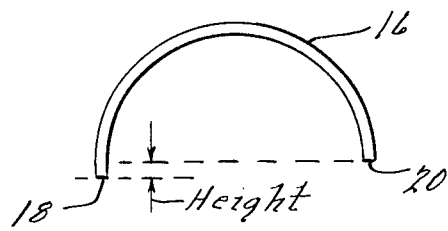
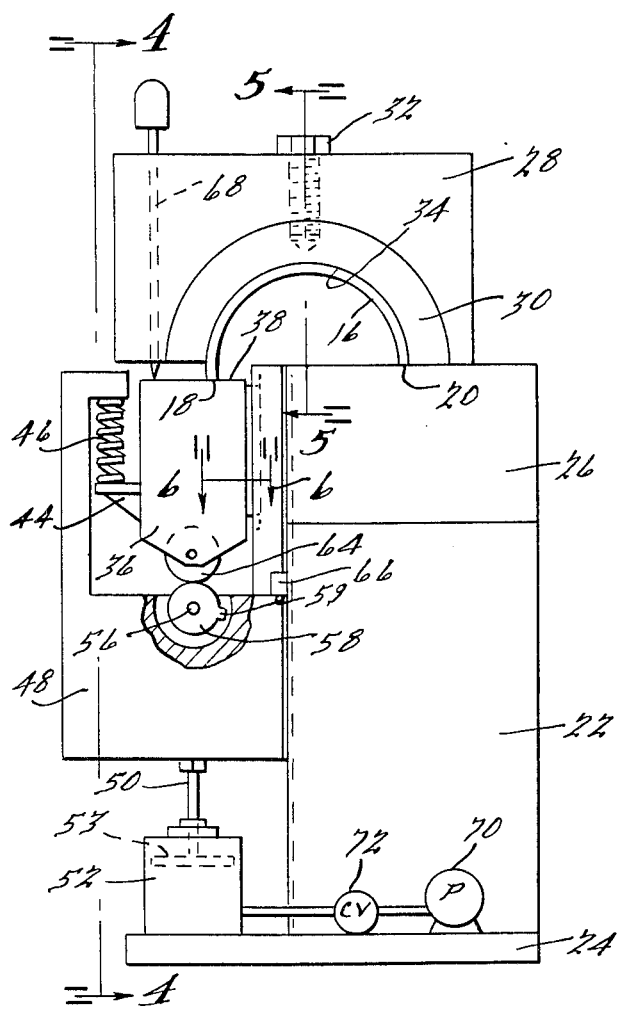
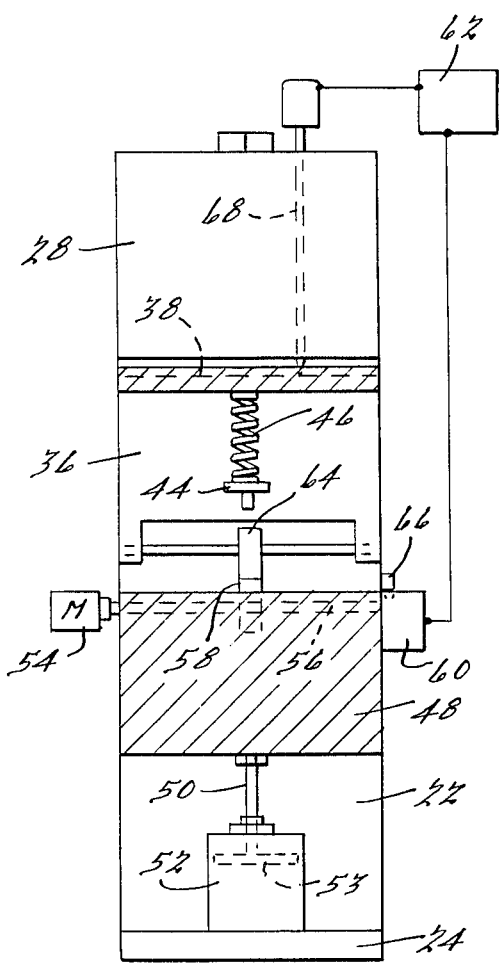

ENGINE BEARING HEIGHT GAGE

BACKGROUND OF THE INVENTION

The present invention broadly relates to an apparatus for measuring the arcuate length of arcuate strip articles, and more particularly for measuring the interference or height of shell-type half bearings.

Shell or sleeve-type precision half bearings which are of a generally semi-circular cross section are in widespread use for rotatably supporting journals such as crankshafts and connecting rods in automobile internal combustion engines and the like. Such shell-type bearings are generally of a composite construction comprising a hard metal backing strip such as steel to the inner concave surface of which a thin bearing lining is tenaciously bonded and machine finished to precision tolerances. A typical method of manufacturing such shell-type half bearings through a sequential blanking, stamping, forming, trimming, machining and finishing sequence is described in U.S. Pat. No. 3,206,830 granted Sept. 21, 1965 to the assignee of the present invention, the teachings of which are incorporated herein by reference by way of example.

One of the several important dimensional tolerances that must be maintained within specifications is the interference or height of the shell-type half bearing which most commonly is that distance beyond a certain number of arc degrees, usually 180 degrees, that one parting edge of the bearing projects. A proper interference or height of such precision shell-type half bearings is necessary to assure a proper seating of two assembled half bearings such as in a connecting rod and connecting rod cap forming a press fit upon final assembly.

In accordance with conventional quality control practices, final finished bearings are manually inspected including a manual measurement of the interference or height to assure that they are within specifications. Such manual inspection is not only tedious and time-consuming, but also is costly and labor intensive in consideration of the large volume of such bearings produced in automatic manufacturing machines.

The present invention overcomes many of the problems and disadvantages associated with prior art manual interference measuring techniques by employing an apparatus which is adapted to operate at high speed for measuring each individual bearing transferred from final finishing operations. Further, it provides an accurate reading of the interference or height thereof under measuring conditions that can be maintained substantially constant thereby assuring precision products. The present invention further provides for flexibility and versatility in enabling automatic measurement of shell-type half bearings of different sizes and is readily adaptable to conventional instrumentation for segregating bearings within prescribed specifications from those outside such specifications.

SUMMARY OF THE INVENTION

The benefits and advantages of the present invention are achieved by an apparatus particularly adapted for measuring the interference of semicylindrical shell-type half bearings which apparatus comprises a framework on which a bearing cap is mounted incorporating a shape-conforming cavity to the convex surface of a bearing to be measured. The bearing cap includes a supporting surface for engaging one parting edge of a bearing being measured. A gage block is reciprocably supported on the framework for movement toward and away from the bearing cap and includes a gaging surface which is adapted to be disposed in engagement with the second parting edge of a bearing being measured. A carrier is also supported on the framework for movement along an axis substantially parallel to the axis of reciprocation of the gage block. Coacting means such as a rotating cam is preferably disposed on the carrier for coaction with the gage block, and preferably a roller cam follower thereon, for intermittently reciprocating the gage block to and from a measuring position in which the gaging surface is disposed in engagement with the second parting edge of the bearing to a second clearance position spaced therefrom. Biasing means such as a spring is employed for urging the gage block toward the carrier to maintain constant contact between the cam and cam follower. A second biasing means, preferably a fluid actuated cylinder is connected to the carrier for applying a preselected load on the carrier in a direction toward the gage block thereby applying a preselected load to the second parting edge of a bearing being measured assuring that the bearing is in firm seated relationship within the bearing cap. A sensing probe is employed for sensing and measuring the interference or height of a bearing being measured when the gaging surface is in the measuring position and can be conveniently connected to a central control system for visually or mechanically signaling whether the bearing being measured is within or without specifications.

Additional benefits and advantages of the present invention will become apparent upon a reading of the Description of the Preferred Embodiments taken in conjunction with the accompanying drawings.

BRIEF DESCRIPTION OF THE DRAWINGS

FIG. 1 is a schematic plan view of a measuring device of the present invention including a loading chute and a discharge chute for transferring bearings for measurement through the device;

FIG. 2 is a side elevational view of a typical shell-type half bearing;

FIG. 3 is a fragmentary partially schematic front elevational view of the essential components of the measuring apparatus of the present invention and showing the bearing cap portion in magnified scale relative to the remaining structure illustrated;

FIG. 4 is a fragmentary partially schematic side sectional view of the apparatus as shown in FIG. 3 and taken substantially along line 4—4 thereof;

DESCRIPTION OF THE PREFERRED EMBODIMENTS

Figure 5:
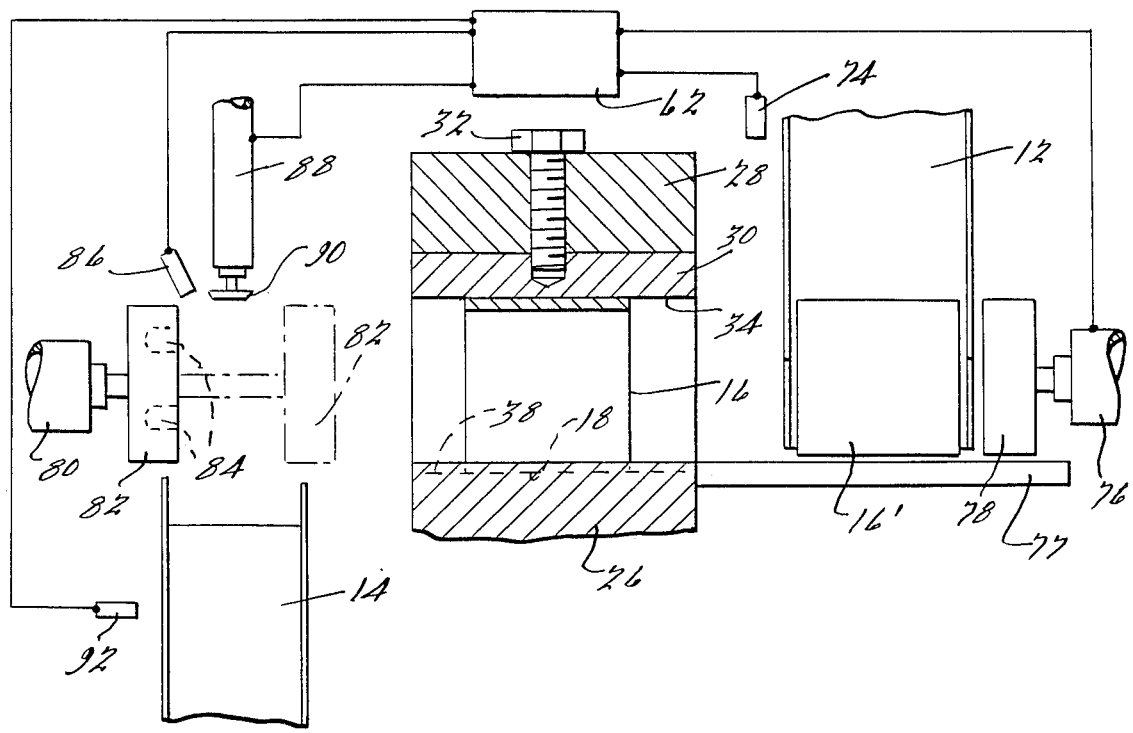
FIG. 5 is a magnified transverse sectional view through the bearing cap portion of the measuring device shown in FIG. 3 and taken substantially along the line 5—5 thereof.

Referring now in detail to the drawings, a measuring apparatus generally indicated at 10 in FIG. 1 is adapted to be disposed in line with automatic conveying devices for receiving precision shell-type half bearings from final finishing operations through a conventional inclined gravity feed type loading chute 12 which after measurement are discharged through a similar type unloading or discharge chute 14. A shell-type half bearing 16 or alternative arcuate strip work piece is illustrated in FIG. 2 and the interference or height thereof to be measured comprises that distance in which one parting edge 18 thereof projects beyond an angularity of 180 degrees as measured from the other parting edge 20 thereof. As previously mentioned, such shell-type half bearings conventionally are of a composite construction comprising a hard metal backing strip such as steel defining the outer convex surface of the bearing which is provided with a soft metal bearing lining metallurgically bonded to the inner concave surface thereof and adapted to be disposed adjacent to the journal or shaft rotatably supported in the final bearing assembly.

Referring now to FIGS. 3, 4 and 5 of the drawings, the essential components of the measuring apparatus comprises a framework 22 including a base 24 and a table 26 fixedly secured to the top of the framework 22. A jig or bearing cap 28 is securely fastened on the upper surface of the table 26 which preferably is of a composite construction including a cap segment or insert 30 removably secured therein such as by means of a screw 32. The provision of the removable cap insert enables replacement of the insert with alternative inserts of different sizes to accommodate bearings of different diameter as may be required from time to time.

In accordance with the arrangement as best seen in FIGS. 3 and 5, the cap insert 30 is formed with a substantially semicircular cavity 34 for receiving the bearing 16 to be measured with its outer convex surface adapted to be seated in firm contacting relationship against the surface of the cavity and with the parting edge 20 disposed in abutting relationship against the upper surface of the table 26.

Figure 6:
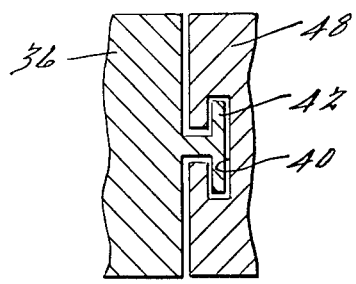
FIG. 6 is a fragmentary magnified sectional view of the supporting slide of the gage block to the framework of the apparatus shown in FIG. 3 and taken substantially along the line 6—6 thereof.

A gage block 36 is reciprocably affixed to a U-shaped carrier 48 as best seen in FIG. 3 for movement toward and away from the bearing cap and the bearing 16 supported therein and is formed with a gaging surface 38 at the upper surface thereof adapted to be disposed in abutting engagement against the parting edge 18 of a bearing 16 being measured. Reciprocating movement of the gage block 36 can be achieved, for example by means of a T-shaped slot 40 as best seen in FIG. 6 formed in the side of the carrier 48 in which a T-shaped extension 42 secured to the gage block is slidably and guidably disposed. An alternative satisfactory embodiment is to have the entire gage block 36 closely fitted within a rectangular slot formed in the carrier 48 for relative reciprocable movement. The axis of reciprocation of the gage block 36 is preferably parallel to the end leg of the bearing defining the parting surface 18. The gage block 36 is further provided with an abutment 44 on which a resilient coil spring 46 is seated having its upper end disposed against an inwardly extending leg of the carrier 48 thereby applying a continuous downward biasing force on the gage block urging the gaging surface 38 thereof toward a position spaced from the bearing cap 28.

As best seen in FIGS. 3 and 4, the carrier 48 is slideably secured to the framework 22 for movement along an axis substantially parallel to the axis of reciprocating movement of the gage block 36 and may comprise a T-slot and T-shaped engagement member of a type similar to that previously described in connection with FIG. 6. The carrier 48 is supported at its lower end by means of a rod 50 connected to a fluid actuated piston 53 within a cylinder 52 supported on the base 24 for applying a preselected upward loading or force to the carrier.

In the specific arrangement illustrated, the carrier 48 supports and carries a motor 54 connected to a transverse shaft 56 to which an eccentric cam 58 is secured and rotated thereby. The opposite end of the shaft 56 is preferably connected as shown in FIG. 4, to a cam box 60 which senses the angular disposition of a lobe 59 of the eccentric cam 58 and communicates that position to a central control box diagramatically indicated at 62 in FIG. 4. The periphery of the cam 58 is disposed in rolling bearing contact with a circular roller or cam follower 64 rotatably supported and connected to the lower end portion of the gage block 36.

In accordance with the foregoing arrangement, the carrier 48 is elevated to a preselected position against a fixed stop 66 prior to initial feeding of bearings through delivery chute 12 to the measuring apparatus 10. Thereafter, as each bearing is fed to the measuring apparatus, the gage block is intermittently reciprocated relative to the carrier and bearing cap in response to rotation of the cam 58. The location of the stop 66 is selected so that when the roller 64 on the gage block 36 is disposed in contact with the neutral portion of the cam 58 the biasing spring 46 will maintain the gage block and gaging surface 38 thereof in a downwardly biased clearance position out of contact with any bearing that might normally be expected to be inserted in the gage block for measurement. This also enables any bearing that has been measured to be slideably extracted from the bearing cap without difficulty. When a new bearing to be measured has been transferred into the bearing cap further rotation of the cam 58 effects a raising movement of the gage block 36 to a position wherein the gaging surface 38 thereof firmly engages the parting edge 18 of the bearing 16. As the cam 58 continues to rotate such that the lobe 59 is at its maximum peak, the carrier 48 is moved downwardly out of engagement with the stop 66 such that the net force applied through the system to the parting edge 18 of the bearing is controlled by the specific fluid pressure in the cylinder 52. The diameter of the piston 53 and the aforesaid specific fluid pressure employed will vary from bearing size to bearing size with the criteria being only that a sufficient force shall be imparted to the parting edge 18 of the bearing to make certain that it is in full conformance with the surface of the semi-circular cavity 34 thereby achieving an accurate measurement of the height.

The interference or height of the bearing is sensed by a probe 68 as best seen in FIG. 3 which may be of a mechanical, and preferably, of an electronic type which is triggered to read the measured interference at the point that the lobe 59 on the cam 58 is at substantially the vertical position and in contact with the roller 64 imparting maximum lift to the gage block 36. An electronic probe which has been found particularly suitable for this purpose is available from Valenite Metals Company of Detroit, Mich. and is designated as an electronic column gage—model No. 710-006.

The maintenance of a preselected pressure in the cylinder 52 can conveniently be achieved by a pump 70 incorporating a check valve 72 for supplying a fluid such as air under the desired pressure which can be varied depending upon the specific diameter and length of the bearing being measured to assure proper loading thereof at the point of measurement.

The measuring apparatus of the present invention is readily adapted to automatic operation providing for bearing measurements at a rate as high as 1 each second. This is conveniently achieved by employing various sensing devices and an interlocked central control circuit of any of the types conventional in the art to assure appropriate sequencing of the several operating components. For example, in accordance with a typical automatic operating cycle, and with specific reference to FIGS. 3-5 of the drawings, the presence of a bearing 16' as shown in FIG. 5 on the feed end 77 prior to being pushed into the recess of bearing cap 28 is sensed by a sensor 74 as the bearing is gravity fed thereto from inclined loading chute 12. Sensor 74 then signals the central control box 62 which in turn actuates a fluid actuated cylinder 76 having its rod end portion connected to a pusher 78 which commences to advance the bearing 16' into the cavity 34 of the bearing cap 28. The central control circuit 62 is also interlocked with the cam box 60 on the cam shaft as shown in FIG. 4 to assure that the lobe on the cam 58 is angularly disposed out of contact with the roller 64 whereby the gage block and gaging surface 38 thereof is positioned downwardly in a clearance position enabling the measured bearing 16 therein and the new bearing 16' to be measured to be transferred from and to bearing cap 9, respectively. Simultaneously, the energization of the pusher 78 and associated cylinder 76 is accompanied by an energization of a cylinder 80 as shown in FIG. 5 having its rod end portion connected to an extractor 82 formed with a permanent magnet 84 in the face thereof which moves from the position as shown in solid lines in FIG. 5 to a predetermined position as shown in the phantom.

The measured bearing 16 as shown in FIG. 5 is advanced toward the left and the left side edge thereof as viewed in FIG. 5 is disposed in contact with the face of the extractor 82 and is engaged thereby by the permanent magnets. Upon completion of the inward strokes of the cylinders 76 and 80, the cylinder direction is reversed whereby the pusher 78 is withdrawn and the extractor 82 is withdrawn from the position shown in phantom to the position as shown in solid lines in FIG. 5. When the extractor attains the retracted position, a sensor 86 signals the central control circuit 62 of that event which then activates a cylinder 88 having its rod end connected to a stripper 90 which moves downwardly effecting a stripping of the measured bearing from the face of the extractor 82 and the bearing enters the discharge chute 14. A sensor 92 adjacent the discharge chute 14 senses the passage of a measured bearing down the discharge chute. Simultaneously with the retraction of the pusher and extractor, the motor 54 on the carrier and the eccentric cam 58 rotate such that the lobe again lifts the gaging block and the probe 68 effects a measurement of the newly inserted bearing. The specific measurement is communicated to the central control circuit 62 which can provide a visual readout of the interference of the bearing measured. Preferably, the central control circuit 62 further includes means for entering a prescribed range of bearing interferences which are within specifications such that when a bearing measurement as electronically communicated to the central control system is either below or above such range, the control circuit is operative to move a diverter (not shown) in the discharge chute 14 as shown in FIG. 5 for diverting undersize bearings and oversize bearings to separate transfer rails for reworking.

In accordance with an alternative satisfactory embodiment of the present invention, it is contemplated that the extractor may comprise a member having a convex surface conforming to the inner diameter of the bearing being extracted incorporating permanent magnets therein to support and magnetically retain the bearing thereon. A mechanical stripping device is provided which enables the extractor to pass relative thereto but to abut the side edge of a bearing on the extractor effecting a mechanical stripping thereof in response to the retracting movement of the extractor.

While it will be apparent that the preferred embodiments of the invention disclosed are well calculated to fulfill the object above stated, it will be appreciated that the invention is susceptible to modification, variation and change without departing from the proper scope or fair meaning of the subjoined claims.

What is claimed is:

1. An apparatus for measuring the interference of semicylindrical bearings or the like formed with diametrically disposed first and second parting edges, said apparatus comprising a shape-conforming bearing cap for receiving and supporting a bearing to be measured, a supporting surface for engaging the first parting edge of a bearing, a gage block reciprocally supported for movement toward and away from said bearing cap including a gaging surface adapted to be disposed in engagement with the second parting edge of a bearing, a carrier supported for movement along an axis, first biasing means for yieldably biasing said gage block toward said carrier, second biasing means for biasing said carrier under a preselected load toward said gage block, coacting means on said carrier and said gage block for intermittently reciprocating said gage block to and from a measuring position in which said gaging surface is disposed in engagement with the second parting edge of a bearing under said preselected load to a second position spaced therefrom, means for restricting movement of said carrier when said gaging surface is in said second position, and means for sensing the interference of a bearing being measured when said gage block is in said measuring position.

2. The apparatus as defined in claim 1 in which said bearing cap is of a composite construction including a removably mounted cap segment formed with a shape-conforming cavity substantially corresponding to the size of a bearing being measured.

3. The apparatus as defined in claim 1 in which said first biasing means comprises a resilient spring.

4. The apparatus as defined in claim 1 in which said second biasing means comprises a fluid actuated cylinder connected to a source of fluid under pressure for biasing said carrier under said preselected load.

5. The apparatus as defined in claim 1 in which said coacting means comprises cam means on at least one of said gage block and said carrier for intermittently reciprocating said gage block.

6. The apparatus as defined in claim 5 in which said cam means comprises a rotatable cam on said carrier disposed in coacting relationship with said gage block.

7. The apparatus as defined in claim 6 further including a rotatable cam follower on said gage block disposed in coacting relationship with said cam.

8. The apparatus as defined in claim 6 further including motor means on said carrier for rotating said cam.

9. The apparatus as defined in claim 1 further including loading means for transferring a bearing to be measured into said bearing cap when said gage block is in said second position.

10. The apparatus as defined in claim 1 further including unloading means for extracting a bearing from said bearing cap after being measured when said gage block is in said second position.

11. The apparatus as defined in claim 1 further including sensing means for sensing the position of said gage block and control means responsive to said sensing means for unloading a measured bearing from said bearing cap and introducing a new bearing for measurement into said bearing cap when said gage block is in said second position.

12. The apparatus as defined in claim 1 in which said carrier is supported for movement along an axis substantially parallel to the axis of reciprocation of said gage block.

* * * * *